United States Patent [19]
Alioto

[11] Patent Number: 5,782,628
[45] Date of Patent: Jul. 21, 1998

[54] EDUCATIONAL DEVICE FOR TEACHING THE SEVERELY MENTALLY HANDICAPPED THE BASIC SKILLS OF FUNCTIONAL ARITHMETIC

[76] Inventor: Frank J. Alioto, P.O. Box 92243, Lakeland, Fla. 33804

[21] Appl. No.: 731,854

[22] Filed: Oct. 21, 1996

[51] Int. Cl.[6] .................. G09B 1/06; G09B 23/02
[52] U.S. Cl. ........................... 434/200; 434/205
[58] Field of Search ..................... 434/171, 191, 434/200, 204, 205, 208

[56] References Cited

U.S. PATENT DOCUMENTS

| | | | |
|---|---|---|---|
| 1,396,329 | 11/1921 | Moore | 434/200 |
| 2,304,893 | 12/1942 | Dickson | 434/200 |
| 3,333,351 | 8/1967 | Williams | 434/171 |
| 3,469,325 | 9/1969 | Greenberg | 434/191 |
| 3,504,449 | 4/1970 | Kobler et al. | 434/200 |
| 3,837,096 | 9/1974 | Sterling | 434/200 |
| 3,958,344 | 5/1976 | Lesnak | 434/200 |
| 4,212,117 | 7/1980 | Baldwin et al. | 434/208 |
| 4,212,118 | 7/1980 | Baldwin et al. | 434/208 |
| 4,808,111 | 2/1989 | Pratt | 434/205 |
| 4,927,158 | 5/1990 | Lierman | 434/200 |
| 5,013,245 | 5/1991 | Benedict | 434/171 |
| 5,040,987 | 8/1991 | Frazier | 434/200 |

FOREIGN PATENT DOCUMENTS

| | | | |
|---|---|---|---|
| 175047 | 2/1985 | Switzerland | 434/205 |
| 768450 | 2/1957 | United Kingdom | 434/205 |

*Primary Examiner*—Paul J. Hirsch

[57] ABSTRACT

This special education device is used by the severely mentally retarded, who may also have severe physical handicaps, in the teaching of the basic skills of functional arithmetic. The device consists of three elements—special blocks, a base and pegs. The blocks have the shape of the numeral on the top surface and apertures equal to the value of the number. In addition, the apertures are structurally configured to the shape of the numeral. The blocks also have one aperture on the side in which pegs with a cross-section other than circular can be inserted. The base has a means of stopping the first block and allowing other blocks to be joined in a specific direction corresponding to mathematical processes. The structural relationship of the three elements makes it possible for the instructor to obtain immediate feedback and detect mistakes before they become habitual.

1 Claim, 3 Drawing Sheets

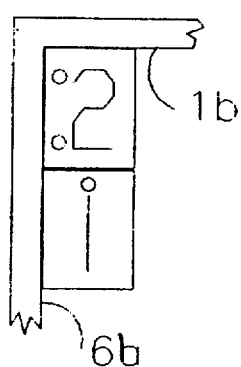
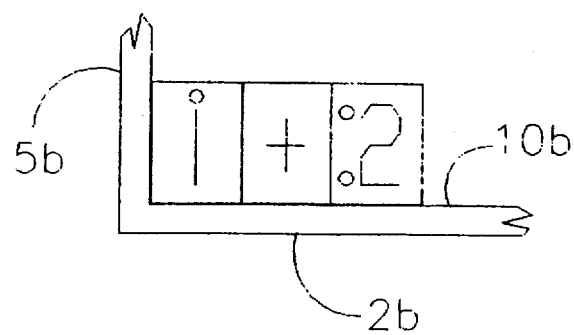
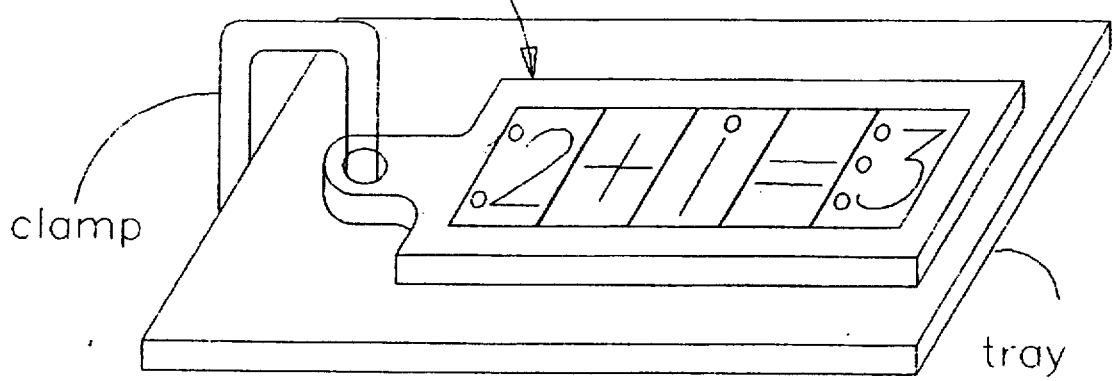

EDUCATIONAL DEVICE FOR TEACHING THE SEVERELY MENTALLY HANDICAPPED THE BASIC SKILLS OF FUNCTIONAL ARITHMETIC

PRIOR ART

A. Search of Previous Patents

Using the computer at a number of Depository Libraries, I compiled a list of at least 100 patents that fit into the following classifications:

434-200; 434-203; 434-204; 434-205; 434-206; and 434-208

The major classification 434—Education, and the subclasses related to mathematics and blocks were searched. Attached is a list of some these patents which were reviewed. After I located the patent in the Cazeteer, I examined the abstracts and the drawings. If there appeared some similarity with my educational device, I obtained a copy of the patent and proceeded with a more detailed examination.

After this research, I have not found any patent which could be used by the severely mentally retarded to achieve the objectives of my educational device, even with major modifications.

There are many reasons why my search did not uncover similar educational devices. In my sections "objects and Advantages" and the "Detailed Description", I go into these reasons in greater detail.

Very briefly they can be summarized as follows:

1. Specific needs of the severely mentally handicapped.
   a. Severely low mental level—IQ under 40
   b. Severe physical disabilities—poor finger dexterity and poor control of arm movement.
3. Little or no skills in writing
4. Speaking skill very low
5. Negative historical attitudes—confined in State institutions
6. Limitations of the use of computers
7. Extreme difficulty in unlearning mistakes
8. Harmful effects in using inappropriate educational devices

SUMMARY

This special educational device has been developed to meet the specific disabilities of the severely mentally retarded who not only have severe mental handicaps but severe limitations in arm movement and finger dexterity. The device comprises three elements—special blocks, a special supporting base and pegs. The block has a number of structural characteristics including the shape of the numeral on its top face; apertures in the top surface equal to the value of the number; these apertures spaced so that the configuration is similar to the shape of the number; and the apertures and shape related in a special relationship.

The block also has an aperture on the side so that blocks are joined with pegs which have a configuration other than circular. By inserting pegs into these apertures on the top surface, the student is able to learn how to count and relate the shape of the numeral to the value of the numeral.

A special base has a means of stopping the blocks on the left side so that other blocks may be added, in a manner similar to the addition and subtraction process. The blocks are further constrained so that the sliding of additional blocks is always in the same direction and can be joined correctly using the appropriate type of peg.

Blocks can be sorted in a vertical direction by using the pegs, as shown in FIG. 4.

In order to go beyond the number 9, apertures which are triangular or different in cross-section than circular, are used for the number 10. In FIG. 5, blocks 4d,5d show how the number 11 is visually presented.

To help the student understand the concept 0, block 5a of FIG. 2, has a zero without any apertures.

FIG. 1 is only one embodiment showing how the blocks and pegs are combined with the base to perform addition and subtraction.

The instructor can easily observe any errors which are made by the student before they become habitual mistakes.

OBJECTS AND ADVANTAGES

A. Crucial Need for Educational Devices for the Severely Mentally Retarded

1. Need for Self-Sufficiency and Independence

There are millions of mentallly handicapped persons in the United States and throughout the world who must be trained to function effectively as adults. In order to achieve this important objective, special education is needed in the vocational field and in the area of living usefully in tax-supported institutions and group homes.

A basic knowledge of skills in practical aritmetic is extremely important for the severely mentally retarded. For example, in a sheltered workshop, the severely mentally handicapped person could collate papers for pamphlets and booklets as well as sort objects, if the person was familiar with counting and sequence of numbers.

Basic skill in functional arithmetic such as telling time, use of money and understanding a calendar would also be of great value.

Opportunites to work in restaurants or to help at the kitchens of residences would be available if these basic skills were acquired.

Unfortunately, this education in practical arithmetic skills is severely limited because instructors do not have suitable educational devices that can be used by the severely mentally handicapped.

2. High Cost Per Student to Educate the Severely Retarded

Because the severely retarded person has a very low mental level (I.Q. about 33) as well as severe physical handicaps, the ratio of instructor to student may be as high as one instructor to 4 students and even a ratio of 1 to 2 students. In a regular classroom, the ratio may be one instructor to 20 or 25 students.

If there were suitable educational devices available, an instructor could teach a larger number of students since the student could learn more independently.

In the United States there is a possibility that Federal and other tax money for education could be reduced. This may have an effect on effectiveness of teaching the mentally handicapped. Educational devices for the severely mentally retarded would tend to reduce any negative effects from these reductions in money.

3. Why is There a Great Lack of Educational Devices for the Retarded

There are many reasons why there is almost a complete lack of suitable educational devices for the severely retarded.

a. Historical Attitudes Toward the Severely Retarded

Previous to the recent Federal laws which require education for the severely mentally handicapped, they were confined to large tax-supported State Institutions. They were considered uneducable and were placed in "custodial care". Only the basic necessities of life were provided—food, clothing, shelter and medical services. They were not considered capable to be trained for any work in the community or even a sheltered workshop This basic attitude has only recently been changed. Severely mentally hanidcapped are placed in group homes and are being trained to work in the community or a sheltered workshop.

Educational devices that were used by other students were not adequate and a need has developed for those devices which can be used by them.

b. Special Needs of the Severely Handicapped (1) Low Mental Level

A severely mentally handicapped child who is 6 years old with an I.Q. of about 33, would have the mental age of about 24 months. This relationship may even be lower since other factors such as social skills, specific mental disabilties may exist.

It is not a question of merely a slowness of the normal growth of mental processes such as visual memory, relationship between shapes and values of numbers but of determining specific deficits and providing special experiences to strengthen these deficiencies.

Any educational device for the severely mentally retarded must take all of these factors into consideration.

(2) Severe Physical Handicaps

Because of severe brain injuries or other factors, the severely mentally child usually has severe limitations in finger dexterity, wrist movement and arm movement. In working with blocks, the student may not be able to hold two blocks, one in each hand, or to place two blocks together on a surface without disturbing any order in these blocks. Turning a screw or bolt, or moving some type of slide mechanism might be impossible because of these physical disabilities. Again, these are reasons why educational devices are not available.

(3) Little or No Ability to Write

Writing plays an important role in the teaching of the shapes of numbers and other aritmetical tasks. Because of severe limitations in finger manipulation and wrist movement, this method of instruction would not be available for many students. An educational device would have to compensate for this deficiency by some other means.

(4) Little or No Ability to Communicate Verbally

A severely mentally hanicapped student may have many weaknesses' in the area of speech and articulation. Verbal tests which are frequently used in the regular classroom would not be feasible with many students.

The student may be internally frustrated by constant failure and not be able to communicate this problem to the instructor.

An educational device would have to include a means by which immediate feedback would be clearly seen by the instructor.

4. Need for Early Age Intervention

Research has shown that there is greater progress among the mentally retarded, in general, as well as the severely mentally retarded, if the mental disabilities are discovered at an early age. When these specific disabilities are found, appropriate education can be started to strengthen these weaknesses. If training were to start at a pre-school age of 3 or 4, then the instructor would need an educational device that could be understood by a toddler of about 12 to 16 months.

Classes for this age group presently exist and apprpriate educational devices are greatly needed.

B. How My Educational Device Meets All of These Needs

As a result of years of experimentation, I have developed educational devices that meet all of the needs which have been described. In my "detailed description" section, I elaborate upon how each mental, physical and other difficulties are overcome. Special blocks in combination with a special supporting base and suitable pegs are uniquely combined to form a variety of educational aids to meet every speciific problem.

My educational device is simple; can be understood by young child; within the physical limitations of the student. Immediate feedback is clearly given to the instructor; individualized tasks can be assigned and the overall rate of learning is increased.

Additional advantages of my educational device include the following:

1. Supervisory and instructional costs are, substantially reduced.
2. More students can be taught by the same instructor without impairing the learning process.
3. The use of the device is self-reinforcing and motivating.
4. More than one student can use the device at the same time.
5. Special pre-vocational skills are learned which substantially improve the possibilities of employment.

C. Limitations and Dangers in Using Computers with the Severely Retarded

Computers have been used successfully with children in the teaching of basic skills in arithmetic. A severely mentally retarded student could also learn to use a computer to a certain degree. However, there would be serious ommissions and possible negative effects if only computers were used as educational devices. There is sufficient research in the medical and psychological fields, related to brain injury, that demonstrates a crucial need for real three dimensional experiences. The absence of these real life experiences could further retard the development of the severely mentally handicapped student. Actual activities which involve the movement of arms and hands away from the body is essential for experiencing and understanding key concepts. In the normal development of a child, these take place naturally, but with the severely retarded person, they must be taught.

In my specifications, I show how my device provides these needed experiences.

D. Harmful Effects from Using an Inappropriate Educational Device

In a regular classroom, if a student makes mistakes repeatedly, the instructor can usually correct these mistakes over a short period of time. The student could unlearn the mistakes and proceed to learn the new and correct method.

Because of the low intelligence level of the severely retarded student, as well as other factors, mistakes are not unlearned easily. Errors may continue over a long period of time and may never be corrected, eventhough correct learning experiences are being provided.

To avoid these negative effects, it is extremely important that any educational device used by the severely mentally hadicapped be specifically developed to meet the specific and unique needs of the student.

DRAWINGS

FIG. 1—One model of the educational device showing the three elements used in the teaching of addition and subtraction FIG. 2—Blocks 1a,2a and 3a show the special characteristics of the blocks namely, apertures equal to the number on the surface and the shape of the number correlating with the arrangement of the apertures Block 4a shows the typical block which lacks the unique characteristics of the blocks 1a,2a and 3a. Block 5a has no apertures for teaching the meaning of zero FIGS. 3A, 3B, 3C—various models of the supporting base that meet the specific needs of the severely mentally handicapped.

FIG. 4—Shows how the blocks and pegs can be used to sort numbers

FIG. 5—Blocks 1d and 2d are joined together by a peg in order to match shapes of numbers and form dominoes. Blocks 4d,5d,6d and 7d show how numbers higher than 9 can be formed by modifying the cross-section of the apertures and the pegs.

Note: The size of the drawings are 21.0 by 29.7 cm. since I plan to file Internationally.

DETAILED DESCRIPTION

III—Elements of this Special Educational Device

This educational device comprises three special elements which have been specifically developed to assist in teaching the severely mentally retarded the basic skills of functional arithmetic. These elements comprise:

A. Blocks, with apertures equal in number to the number placed on the surface of the block; which apertues are spatially arranged so that the shape of the number is clearly associated with the arrangement of the apertures.

B. A supporting base which holds these blocks in a fixed position similar to that used in the processes of addition and subtraction; which provides stability and support to these blocks; to serve other purposes.

C. Special pegs that can be used by the severely mentally retarded; that are inserted into the apertures of the blocks; and to serve other purposes.

Figure 1:
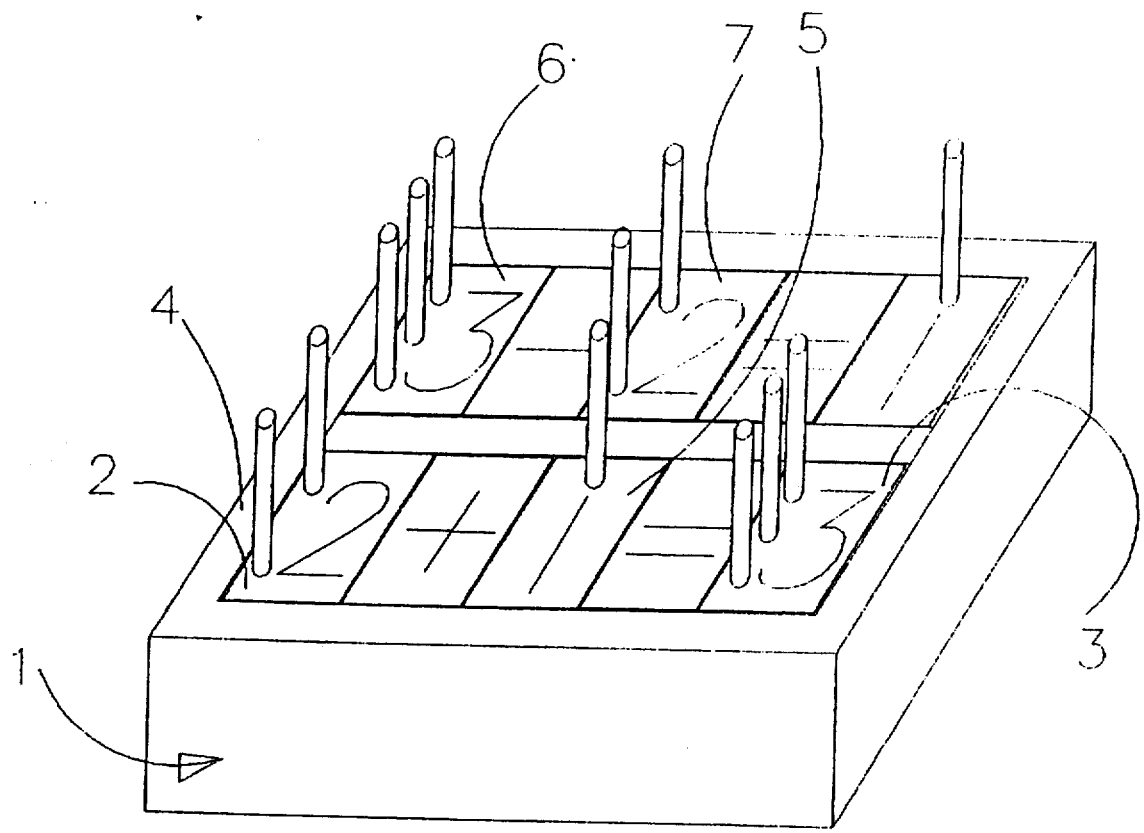

FIG. 1 is only one representation of the educational device which shows the interrelationships of these three elements. In this model, the basic principles and skills of addition and subtraction are being taught. With the same three elements, another educational device could be formed to teach counting; concepts of more vs. less; the value of numbers and their shapes, etc. My description will begin with a detailed description of each of the elements and how they meet the special needs of the severely mentally retarded.

A. Blocks and low mental level of the severely retarded

A student may be able to count 1, 2 and 3 but does not understand that each symbol has a value and that the difference between the numbers of this sequence is 1. That is, the student is not aware of the fact that 1 is a symbol representing 1 real object; 2 for 2 real objects, etc.

The knowledge of these basic facts in arithmetic has great significance for the severely mentally retarded. With this knowledge, they would be able to find employment where collating, sorting and measurements are involved. In a restaurant or in a kitchen in their residences, they could help in setting tables or measuring food for cooking purposes.

Telling time, reading a calendar, using a ruler would also assist in increasing their employment possibilities.

However, it is extremely difficult to teach the severely mentally handicapped these skills because they possess severe mental disabilities in a number of areas. With my educational device it is possible to determine specific mental deficits and to provide special learning experiences to strenthen these weaknesses. In my description, I will show how the special blocks of my educational device will consider two of these mental dificiencies; very poor visual memory and extreme difficulty in associating a symbol to concrete objects.

Let us assume, the child is 6 years old, has an I.Q. of about 33 and a mental age of about 24 months. This does not mean that the child will necessarily have a mental age of a three year old in a year. Unless specific mental deficits are discovered early and appropriate learning experiences given to the student, progress may not take place in these or related mental areas.

Figure 2:
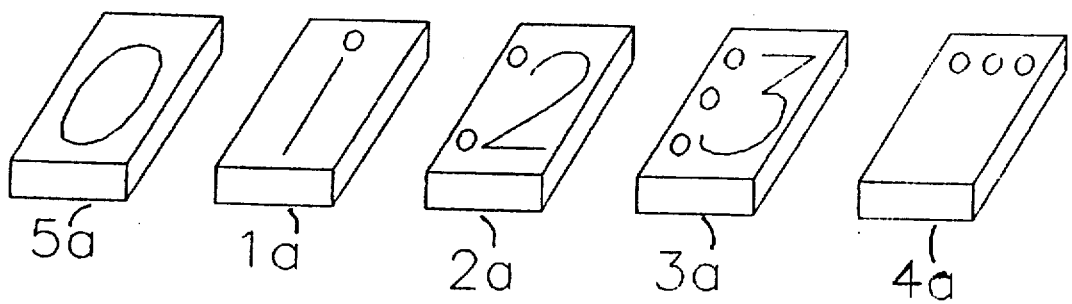

In FIG. 2 there are three special blocks, 1a,2a and 3a which have the numerals 1, 2 and 3 on the top surface. In addition, there is one aperture in block 1a, 2 in block 2a and 3 in block 3a. The shape for the numeral is also directly related to the arrangements of these apertures and is clearly visible.

The instructional objectives to be achieved include the following:

1. To teach the value of the numbers 1, 2 and 3 in terms of real objects.
2. To associate the symbol or shape of 1, 2, and 3 with their values.
3. To help the student to memorize the sequence 1, 2 and 3 and understand there is a difference of 1 between each number.

There are many methods to teach these objectives with my educational device. I will describe only one. These blocks have been placed on a special supporting base (see next section for a descripion of the special requirements of the supporting base), so that block 1a, is fixed at extreme left end of the base. Blocks 2a and 3a have been placed in a left to right direction.

The instructor would insert 1 peg in the aperture of block 1a say 1 and trace the shape of 1 with a finger. The student would also trace the number 1 and attempt to say 1, with assistance from the instructor, if this is necessary. The same procedure would be followed with block 2a and block 3a. The student would then attempt to perform the same tasks by placing the blocks on the base and inserting the pegs.

Visual memory is improved because each time the student sees or works with the pegs and blocks, the relationship between symbol and number of objects as well as the sequence 1, 2, and 3 would be reinforced. The fact that each number in the sequence differ only by the number 1 can easily be taught by comparing the number of pegs in each block of the sequence.

Regular Blocks and the Special Blocks of this Educational Device

To further demonstrate the unique nature of these blocks, consider block 4a, FIG. 2. There are three dots arranged in a horizontal direction and there are no apertures and no symbol on the surface. This type of block or card is often used in a regular classroom. There are many inadequacies in using this block to teach the severely mentally retarded. I will only describe a few of these deficiencies. First, the dot is an abstraction and does not depict a real object familiar to the student. Secondly, the dots are not arranged in a meaningful manner so that the shape of the number 3 is evident. The symbol 3 is not on the surface of the block so that the 3 dots can be assosciated with this specific shape. In addition, the self-satisfying activity of inserting and removing the pegs and forming a structure is missing. Since many repetitive tasks would be necessary for the severely mentally retarded student to grasp the meaning of the concepts which are being taught, boredom and internal frustration could easily develop. This frustration could easily develop into a resistance to learning, in general, as well as to the teaching of arithmetic skills. The special blocks of my education device provide a real three dimensional experience with real objects.

Concept of Zero

At a later date, the student could be introduced to the concept of 0 by using these special blocks. Block 5a, FIG. 2 has a 0 on the surface and no apertures for pegs. It will be concretely evident to the student that 0 is related to no pegs since there is no aperture. To go to "no peg", to no "thing" or "nothing" would not be difficult. In an addition process, when 0 is added, no pegs or objects would be involved and the student would gradual learn that a number is not changed when 0 is added.

Special Blocks and Little or Ability to Write

Because of poor fine motor skills, the severely mentally retarded student may have little or no ability in writing. With these special blocks, tactile and kinesthetic experiences can be given so that the shape of the number can be learned. A groove can be cut into the shape of the number that is placed on the surface of the block. The student can move a peg in this groove or move a finger in the groove. If the shape is raised, another experience can be obtained.

Special Blocks and Little or No Ability to Speak

Teaching is extremely limited if the student is unable to correctly express the sounds for numbers or to communicate to the instructor a lack of understanding of a concept. In a regular classroom, verbal tests can be given to determine mistakes. To overcome these difficulties, these special blocks make it possible for the instructor to immediately see any mistakes that are made and to provide appropriate activities to correct them. For example, the student may successfully place number 1 on the extreme left but reverse the 2 and the 3. This would be seen by the instructor immediately, even though the student would not be able to say "I don't understand", or "the 2 looks like the 3 to me".

If these frustrations are not discovered early, they could result in a resistance to learning not only in arithmetic but in other subjects.

Other Modifications of the Blocks

Figure 5:
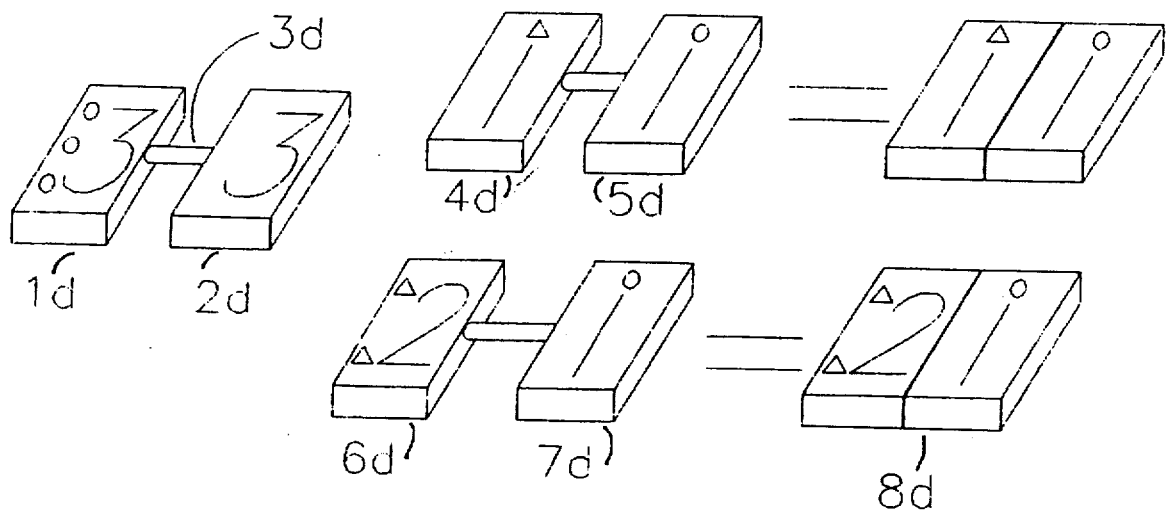

To go beyond the number 9, the circular aperture could be changed into one which is triangular in shape. A peg with a triangular cross-section could be inserted into this aperture and could represent ten. With an aperture on the side of the block, other blocks could be joined to the one representing ten, in order to form 11, 21 etc. FIG. 5, blocks 4d,5d,6d, and 7d show how this can be done.

With apertures on the side, these blocks could be united to form dominoes and thus provide another means of improving the association between shape and values. (FIG. 5, blocks 1d and 2d united by peg 3d.

Special Supporting Base

The second element in this educational device is a special supporting base which must meet the following three requirements in order to meet the needs of the severely mentally retarded.

1. Provide stability and support for the blocks.
2. Provide a means by which the blocks begin at the extreme left end and go the right as well as to provide a means for the blocks to be placed in a top to bottom direction.
3. A means for keeping the base from sliding as blocks and pegs are used.

These special requirements are necessary because the severely mentally retarded not only has severe mental disabilities but may also possess severe physical limitations in finger dexterity, wrist movement and arm movement. I will consider these handicaps and how the supporting base meets all these needs

Special Base and Severe Mental Deficiencies

In the addition and subtraction process, the numbers may be placed in a left to right direction or vertically from top to bottom. It is difficult for the severely retarded student to learn these spatial locations without concrete assistance.

Four representations of the base are shown in FIGS. 1, 3A, 3B and 3C. In FIG. 3B, a means to automatically teach these spatial relationships is shown. A vertical bar, 5b is placed on the extreme left end of base 10b. When the student places a block on this base and slides it against the bar, 5b any additional blocks must be added in a left to right direction. The student is continuously learning directionality eventhough the concepts of left to right are not understood as yet.

Similarly, all the blocks are being guided in a straight horizontal line by the horizontal bar, 2b.

In FIG. 3A, the addition is being made in a vertical direction. The top bar 1b and side bar 6b, keep the blocks in a vertical direction under each other.

Many severely retarded students have difficulty in controlling arm movements and would not be able to stop at a specific point. If bar 1, were not present at the extreme end of the base, blocks could easily be knocked off the base. Not only would this interfere with placing other blocks in sequence but the student would become easily frustrated. This could develop into a resistance to the teaching method, not only in arithmetic but in other subjects as well.

The base would also need some means of preventing it from sliding on the surface as blocks are moved and pegs inserted into apertures. By increasing the weight of the base, placing non-skid material on the bottom surface of the base or clamp the base to the table surface.

In FIG. 3C, a base has been shaped so that the base could easily be clamped to a tray of a wheel-chair or table top.

Pegs and Special Needs of the Severely Retarded

Pegs serve a number of different functions in this device and comprises the third element.

a. Acting as real objects to give meaning to abstract numbers.
b. Understanding the concept of zero
c. sorting numbers on blocks
d. uniting blocks to each other
e. counting and adding beyond the number 9.

a. Real Objects

The severely mentally retarded have extreme difficulty in understanding the meaning of abstractions and symbols such as numbers. To associate the symnbol 3 with 3 real objects can be learned if real objects are used and the associations are repeated many times. The use of pegs with the special blocks of this device, will accomplish these objectives in a satisfying and self-reinforcing manner. For example, when the learning the concept of 3, only 3 pegs are inserted in the three apertures where the number 3 is found on the surface of the block. Three pegs, that is, 3 objects, are always associated wih the symbol 3.

In learning the sequence 1, 2, 3, the student will always see that there is only one peg, that is, only the value of 1, when pegs are inserted into blocks with 1, 2 and 3 on the surface.

Comparing block 3a with block 4a, FIG. 2, will emphasize the unique contribution of the peg as an element in this educational device. Abstract dots are replaced by real pegs inserted in apertures.

In the section which follows, the addition and subtraction processes are described in detail. The special contribution of pegs to give meaning to these processes is clearly made evident to the student.

b. Understanding the Concept of Zero

Pegs in combination with blocks can help the student to grasp the meaning of the concept of 0. In FIG. 2, block 5a has no aperture but has the symbol 0 on the surface. In block 1 there is one aperture and the number 1. The student can insert 1 peg in this aperture but can not insert a peg in the block 5a. Pegs can be inserted in other numbers but never in the block marked with a zero. It is not difficult to have the student undertstand that no "peg", or no "thing" or "nothing" is associated with 0. In addition and subtraction problems, 0 can be used to show that no pegs are involved in the process.

c. Sorting Numbers

The sorting method is one way to help the student discriminate between the shape of numbers. In my device, pegs in association with the special blocks, it is possible to sort numbers within the restrictions of the low mental level and severe disabilities of the severely mentally retarded.

Figure 4:
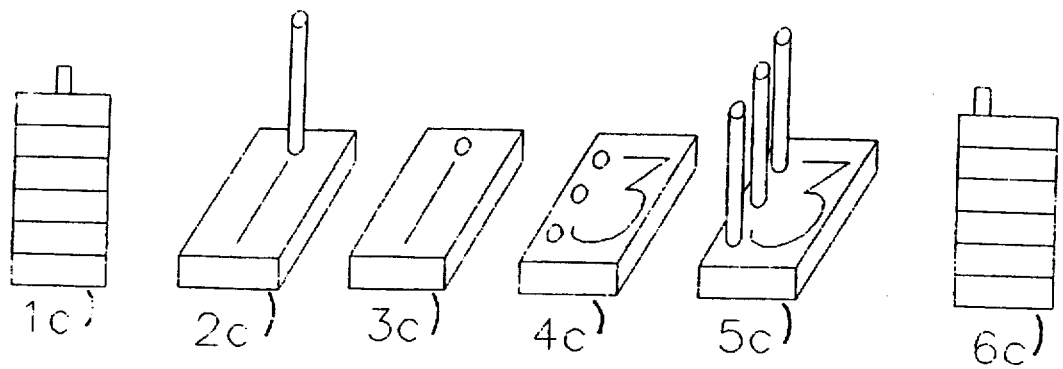

In FIG. 4, the sorting process begins with only two blocks and then with ten blocks. The two blocks 3c and 4c with the numbers 1 and 3 respectively are sorted by fitting them on the respective pegs of blocks 2c and 5c. After mastering the sorting process for two blocks, the student can then sort 10 blocks, that is, 5 with the number 1 and 5 with the number 3. In FIG. 4, block 1c has 5 blocks piled on top of each other. Block 6c has 5 blocks with the number 3.

While this activity is taking place, the value of the number and its symbol is continuously being reinforced in the student's mind. Any mistakes will be immediately seen by the instructor and corrective tasks can be given to the student.

d. Uniting Blocks to Each Other

Pegs can also be used to unite blocks to form dominoes or to show the relationship between numbers on blocks without apertures. In FIG. 5, block 1d with apertures is united with block 2d without apertures to visually strengthen the shape of the number 3. Dominoes can be formed by uniting blocks with different numbers to each other.

e. Counting and Adding Beyond the Number 9

Circular apertures may be used up to the number 9. When the numbers 10, 20 or higher are reached, these special blocks and pegs can still be used. If the aperture in the block is made triangular and a peg with a triangular cross-section is inserted, the value of that number can be 10. The numbers 11 and 21, for example, can be made by joining blocks as shown in FIG. 5. Block 4d with a triangular aperture and peg is united with block 5d with a circular aperture and peg, to form 11. Similarly, block 6d of FIG. 5, has two triangular pegs or 20. When united with block 7d, which has the value of 1, the new block, 8d is formed with the value of 21.

When this is mastered, the skill of counting by tens can also be taught at a level that can be understood by the severely mentally retarded student.

Addition and Subtraction with the Educational Device

FIG. 1 shows how all three elements are integrated to form an educational device to teach the processes of addition and subtraction. The special advantages of each element will be clearly seen as the student performs these tasks. It is assumed that the student is familiar with the use of the blocks and pegs and has learned the sequence 1, 2, and 3.

Before starting, all the blocks and pegs are removed from the top of the supporting base, 1. The student places block 2 on the extreme left end of the base against the stop bar, 4, and then inserts 2 pegs while counting 1, 2. The block with + is added and block 5, with number 1 is placed next to it. One peg is inserted into the aperture of block 5.

It should be noted that the student is already learning a number of important concepts. Each time the blocks and pegs are used, the student is clearly seeing the association between the shape of the number (1 or 2 and the value of the number (1 or 2 pegs). In addition, the student is continuously learning directionality from the left to the right because the blocks start at the extreme left and must go in a horizontal direction from left to right. When the student adds 1 peg of block 5, three objects, namely the pegs, are clearly before the student.

The student now looks among the blocks on the working surface to find the block with three apertures and number 3 on the surface. After placing block 3 on the supporting base next to the equals sign, three pegs are inserted into the apertures while counting 1, 2, 3.

The concept of an equation is again seen by the student as three pegs are counted on the left side and 3 pegs on the right side.

In the subtraction problem, the student places block 6 with 3 pegs on the extreme left side of the base. Block 7 with 2 pegs is then placed next to the minus sign. The student has already been taught that − sign means to "take away"', therefore 2 pegs are taken from block leaving only 1 peg. The student looks for the block with one aperture and places it next to the minus sign and inserts 1 peg into the only aperture in the block.

Immediate Feedback

Throughout these aritmetical processes, the instructor is able to immediately determine, visibly, eventhough the student is unable to speak or write, what mistakes are taking place. The specific mental disability is discovered and appropriate tasks are given to the student to correct these errors. A continuous error is avoided as well as an internal frustration which can easily lead to antagonism against the learning process, in general.

What I claim is:

1. An educational device to teach the severely mentally handicapped the basic skills of functional arithmetic, comprising three elements, special blocks, special supporting base and pegs:

said blocks having a numeral on the top surface of a predetermined shape as used in writing; said blocks having apertures on said top surface equal to the value of said number; said apertures spatially arranged to the shape of said numeral but not touching said numeral;

said blocks having an aperture on at least one of its sides;
said aperture capable of accomodating said pegs having a cross-section; said cross-section being triangular, square, rectangular or circular; said side aperture located in the exact center of the plane of said side; said peg and aperture being used as a means of joining said blocks;
said blocks including a sub-group of blocks with mathematical symbols or a zero on said top surface;
said supporting base having a fixed vertical bar on the extreme left side and horizontal bars perpendicular to said vertical bar, as a means of constraining the blocks in a left to right direction; said supporting base allowing the blocks to be ordered in a horizontal as well as vertical direction; said supporting base having a means by which it is firmly fixed to a table top surface;
said pegs being capable of being inserted and removed from said sides and said top surface of said blocks;
said three elements capable of being manipulated by the mentally handicapped with severe physical handicaps.

* * * * *